United States Patent
Sheoran et al.

(10) Patent No.: US 12,444,049 B2
(45) Date of Patent: Oct. 14, 2025

(54) METHOD AND SYSTEM FOR SEMI-SUPERVISED DOMAIN ADAPTATION BASED UNIVERSAL LESION DETECTION

(71) Applicant: Tata Consultancy Services Limited, Mumbai (IN)

(72) Inventors: Manu Sheoran, Noida (IN); Monika Sharma, Noida (IN); Lovekesh Vig, Noida (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 336 days.

(21) Appl. No.: 18/346,662

(22) Filed: Jul. 3, 2023

(65) Prior Publication Data
US 2024/0020834 A1 Jan. 18, 2024

(30) Foreign Application Priority Data
Jul. 18, 2022 (IN) .............................. 202221041052

(51) Int. Cl.
*G06K 9/00* (2022.01)
*G06T 7/00* (2017.01)
(Continued)

(52) U.S. Cl.
CPC .............. *G06T 7/0012* (2013.01); *G06T 7/60* (2013.01); *G06T 7/73* (2017.01); *G06V 10/764* (2022.01);
(Continued)

(58) Field of Classification Search
CPC ........... G06T 7/0012; G06T 7/60; G06T 7/73; G06T 2207/10072; G06T 2207/20081;
(Continued)

(56) References Cited

U.S. PATENT DOCUMENTS 11,200,679 B1* 12/2021 Li .............................. G06T 7/77
11,961,231 B2* 4/2024 Cheng ...................... G06N 3/09
(Continued)

OTHER PUBLICATIONS

Chaitanya, Krishna et al., "Local contrastive loss with pseudo-label based self-training for semi-supervised medical image segmentation", Medical Image Analysis, Date: Jul. 2023, vol. 87, Publisher: Science Direct, https://www.sciencedirect.com/science/article/pii/S1361841523000531.
(Continued)

*Primary Examiner* — Xin Jia
(74) *Attorney, Agent, or Firm* — FINNEGAN, HENDERSON, FARABOW, GARRETT & DUNNER LLP

(57) ABSTRACT

The present disclosure detects lesions in different datasets using a semi-supervised domain adaptation manner with very few labeled target samples. Conventional approaches suffer due to domain-gap between source and target domain. Initially, the system receives an input image, and extracts a plurality of multi-scale feature maps from the input image. Further, a classification map is generated based on the plurality of multi-scale feature maps. Further, a 4D vector corresponding to each of a plurality of foreground pixels is computed. Further, an objectness score corresponding the plurality of foreground pixels is computed. After computing the objectness score, a centerness score is computed for each of the plurality of foreground pixels using a single centerness network. Further, an updated objectness score is computed for each of the plurality of foreground. Finally, a plurality of multi-sized lesions in the input image are detected using a trained few-shot adversarial lesion detector network.

15 Claims, 8 Drawing Sheets

(51) Int. Cl.

| | |
|---|---|
| *G06T 7/60* | (2017.01) |
| *G06T 7/73* | (2017.01) |
| *G06V 10/764* | (2022.01) |
| *G06V 10/77* | (2022.01) |
| *G06V 10/778* | (2022.01) |
| *G06V 10/82* | (2022.01) |
| *G06V 20/70* | (2022.01) |
| *G16H 30/40* | (2018.01) |
| *G16H 50/20* | (2018.01) |

(52) U.S. Cl.
CPC ........ *G06V 10/7715* (2022.01); *G06V 10/778* (2022.01); *G06V 10/82* (2022.01); *G06V 20/70* (2022.01); *G16H 30/40* (2018.01); *G16H 50/20* (2018.01); *G06T 2207/10072* (2013.01); *G06T 2207/20081* (2013.01); *G06T 2207/20084* (2013.01); *G06T 2207/30096* (2013.01); *G06V 2201/03* (2022.01)

(58) Field of Classification Search
CPC ........... G06T 2207/20084; G06T 2207/30096; G06V 10/764; G06V 10/7715; G06V 10/778; G06V 10/82; G06V 20/70; G06V 2201/03; G16H 30/40; G16H 50/20
See application file for complete search history.

(56) References Cited

U.S. PATENT DOCUMENTS

| | | | | |
|---|---|---|---|---|
| 2021/0224603 | A1* | 7/2021 | Yan | G06V 10/255 |
| 2023/0386032 | A1* | 11/2023 | Wei | G06V 10/82 |

OTHER PUBLICATIONS

Motiian, Saeid et al., "Few-Shot Adversarial Domain Adaptation", Proceedings of 31st Conference on Neural Information Processing Systems, Date: 2017, Publisher: NIPS https://proceedings.neurips.cc/paper_files/paper/2017/file/21c5bba1dd6aed9ab48c2b34c1a0adde-Paper.pdf.

Ouyang, Cheng et al., "Self-supervised Learning for Few-shot Medical Image Segmentation", IEEE Trans Med Imaging, Date: Jul. 2022, vol. 41; Issue: 7, Publisher: IEEE, https://spiral.imperial.ac.uk/bitstream/10044/1/95289/2/few_shot_segmentation_no_template.pdf.

To, Minh-Son et al., "Self-supervised Lesion Change Detection and Localisation in Longitudinal Multiple Sclerosis Brain Imaging", Medical Image Computing and Computer Assisted Intervention—MICCAI 2021, Date: 2021, Publisher: Springer Link, https://arxiv.org/pdf/2106.00919.pdf.

Chen, Ying et al., "Semi-supervised Domain Adaptation for Semantic Segmentation", Sensors (Basel), Date: 2021, https://arxiv.org/pdf/2110.10639.pdf.

Chowdhury, Arkabandhu et al., "Few-shot Image Classification: Just Use a Library of Pre-trained Feature Extractors and a Simple Classifier", 2021 IEEE/CVF International Conference on Computer Vision (ICCV), Date: 2021, Publisher: IEEE, https://arxiv.org/pdf/2101.00562.pdf.

Li, Shaohua et al., "Few-Shot Domain Adaptation with Polymorphic Transformers", Medical Image Computing and Computer Assisted Intervention—MICCAI 2021, Date: 2021, Publisher: Springer Link, https://arxiv.org/pdf/2107.04805.pdf.

Yan, Ke et al., "Learning from Multiple Datasets with Heterogeneous and Partial Labels for Universal Lesion Detection in CT", IEEE Transactions on Medical Imaging, Date: Oct. 2021, vol. 40; Issue: 10, Publisher: IEEE, https://arxiv.org/pdf/2009.02577.pdf.

Yan, Ke et al., "Universal Lesion Detection by Learning from Multiple Heterogeneously Labeled Datasets", Date: May 2020, https://arxiv.org/pdf/2005.13753.pdf.

* cited by examiner

METHOD AND SYSTEM FOR SEMI-SUPERVISED DOMAIN ADAPTATION BASED UNIVERSAL LESION DETECTION

PRIORITY CLAIM

This U.S. patent application claims priority under 35 U.S.C. § 119 to: India Application No. 202221041052, filed on Jul. 18, 2022. The entire contents of the aforementioned application are incorporated herein by reference.

TECHNICAL FIELD

The disclosure herein generally relates to the field of object detection and, more particularly, to a method and system for semi-supervised domain adaptation based universal lesion detection.

BACKGROUND

Lesion is a region in an organ or tissue which has suffered damage through injury or disease, such as a wound, ulcer, abscess, or tumor. Lesion detection is an important problem in medical imaging analysis to identify lesions and to provide appropriate treatment. Universal Lesion Detection (ULD) aims to assist radiologists by automatically detecting lesions in scan images across different organs. Although, existing ULD networks perform well over a trained source domain, they are still far from practically deployable for clinical applications due to their limited generalization capabilities across target datasets acquired using different scanners and acquisition protocols. This domain shift often degrades the detection performance of ULD by over 30-40% when tested on an unseen but related target domain.

Conventionally, there are two approaches to reduce the domain-gap between source and target domain, either by image-to image translation or by aligning the feature-space. In image-to-image translation techniques, researchers have utilized networks such as Style GAN (Generative Adversarial Networks), Cycle GAN etc., to generate source images in the style of target images and train a network on the target translated source-images. On the other hand, in feature-space alignment techniques, the feature-space between source and target domain are aligned using either unsupervised adversarial training or prototype alignment. However, neither of the conventional methods can generate non-discriminatory features such that the discriminator cannot differentiate between the domains and the task-network trained on a labeled source domain can give similar performance on the new target domain. Further, large scale annotation of medical scans is expensive, and it is often feasible to obtain only a few labeled target samples for real world applications. This small amount of annotated data can provide significant gains for domain-adaptation.

SUMMARY

Embodiments of the present disclosure present technological improvements as solutions to one or more of the above-mentioned technical problems recognized by the inventors in conventional systems. For example, in one embodiment, a method for semi-supervised domain adaptation based universal lesion detection is provided. The method includes receiving by one or more hardware processors, an input image, wherein the input image is obtained from a diagnostic medical imaging equipment. Further, the method includes extracting, by the one or more hardware processors, a plurality of multi-scale feature maps from the input image using a Feature Pyramid Network (FPN) based feature extraction framework. Furthermore, the method includes generating, by the one or more hardware processors, a classification map based on the plurality of multi-scale feature maps using a Fully Connected Classifier Network (FCCN), wherein the FCCN classifies each of a plurality of pixels associated with each of the plurality of multi-scale feature snaps into one of, a) a foreground pixel, and b) a background pixel based on a corresponding conditional probability. Furthermore, the method includes computing, by the one or more hardware processors, a 4D vector corresponding to each of a plurality of foreground pixels using a bounding box regressor network, wherein the 4D vector encodes a location of a corresponding bounding box. Furthermore, the method includes predicting, by the one or more hardware processors, an objectness score corresponding to each of the plurality of foreground pixels using a Fully Connected Prediction Network (FCPN), wherein the abjectness score is a confidence score for being one of, the foreground pixel and the background pixel. Furthermore, the method includes computing, by the one or more hardware processors, a centerness score for each of the plurality of foreground pixels using a single centerness network, wherein the centerness score represents a distance between the pixel and a center of a corresponding ground truth bounding box. Furthermore, the method includes computing, by the one or more hardware processors, an updated objectness score for each of the plurality of foreground pixels by multiplying a corresponding centerness score with the corresponding predicted objectness score. Finally, the method includes detecting, by the one or more hardware processors, a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfilling aware few-shot learning mechanism.

In another aspect, a system for Semi-supervised domain adaptation based universal lesion detection is provided. The system includes at least one memory storing programmed instructions; one or more Input/Output (I/O) interfaces, and one or more hardware processors operatively coupled to the at least one memory, wherein the one or more hardware processors are configured by the programmed instructions to receive an input image, wherein the input image is obtained from a diagnostic medical imaging equipment. Further, the one or more hardware processors are configured by the programmed instructions to extract a plurality of multi-scale feature maps from the input image using a Feature Pyramid Network (FPN) based feature extraction framework. Furthermore, the one or more hardware processors are configured by the programmed instructions to generate a classification map based on the plurality of multi-scale feature maps using a Fully Connected Classifier Network (FCCN), wherein the FCCN classifies each of a plurality of pixels associated with each of the plurality of multi-scale feature maps into one of, a) a foreground pixel, and b) a background pixel based on a corresponding conditional probability. Furthermore, the one or more hardware processors are configured by the programmed instructions to compute a 4D vector corresponding to each of a plurality of foreground pixels using a bounding box regressor network, wherein the 4D vector encodes a location of a corresponding bounding box. Furthermore, the one or more hardware processors are configured by the programmed instructions to predict an objectness score corresponding to each of the plurality of foreground pixels using a Fully Connected Prediction Network (FCPN), wherein the objectness score is a confidence score for being one of, the foreground pixel and the background pixel. Furthermore, the one or more hardware processors are configured by the programmed instructions to compute a centerness score for each of the plurality of foreground pixels using a single centerness network, wherein the centerness score represents a distance between the pixel and a center of a corresponding ground truth bounding box. Furthermore the one or more hardware processors are configured by the programmed instructions to compute an updated objectness score for each of the plurality of foreground pixels by multiplying a corresponding centerness score with the corresponding predicted objectness score. Finally, the one or more hardware processors are configured by the programmed instructions to detect a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfitting aware few-shot learning mechanism.

In yet another aspect, a computer program product including a non-transitory computer-readable medium having embodied therein a computer program for semi-supervised domain adaptation based universal lesion detection is provided. The receive an input image, wherein the input image is obtained from a diagnostic medical imaging computer readable program, when executed on a computing device, causes the computing device to equipment. Further, the computer readable program, when executed on a computing device, causes the computing device to extract a plurality of multi-scale feature maps from the input image using a Feature Pyramid Network (FPN) based feature extraction framework. Furthermore, the computer readable program, when executed on a computing device, causes the computing device to generate a classification map based on the plurality of multi-scale feature maps using a Fully Connected Classifier Network (FCCN), wherein the FCCN classifies each of a plurality of pixels associated with each of the plurality of multi-scale feature maps into one of, a) a foreground pixel, and b) a background pixel based on a corresponding conditional probability. Furthermore, the computer readable program, when executed on a computing device, causes the computing device to compute a 4D vector corresponding to each of a plurality of foreground pixels using a bounding box regressor network, wherein the 4D vector encodes a location of a corresponding bounding box. Furthermore, the computer readable program, when executed on a computing device, causes the computing device to predict an objectness score corresponding to each of the plurality of foreground pixels using a Fully Connected Prediction Network (FCPN), wherein the objectness score is a confidence score for being one of, the foreground pixel and the background pixel. Furthermore, the computer readable program, when executed on a computing device, causes the computing device to compute a centerness score for each of the plurality of foreground pixels using a single centerness network, wherein the centerness score represents a distance between the pixel and a center of a corresponding ground truth bounding box. Furthermore, the computer readable program, when executed on a computing device, causes the computing device to compute an updated objectness score for each of the plurality of foreground pixels by multiplying a corresponding centerness score with the corresponding predicted objectness score. Finally, the computer readable program, when executed on a computing device, causes the computing device to detect a plurality of multi-sized lesions in the input image based on the updated abjectness score corresponding to each of the plurality of foreground pixels and corresponding 4D vector using a trained few-shot adversarial lesion detector network, wherein the few-shot adversarial lesion detector network is trained using a periodic gradient updation based overfilling aware few-shot learning mechanism.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
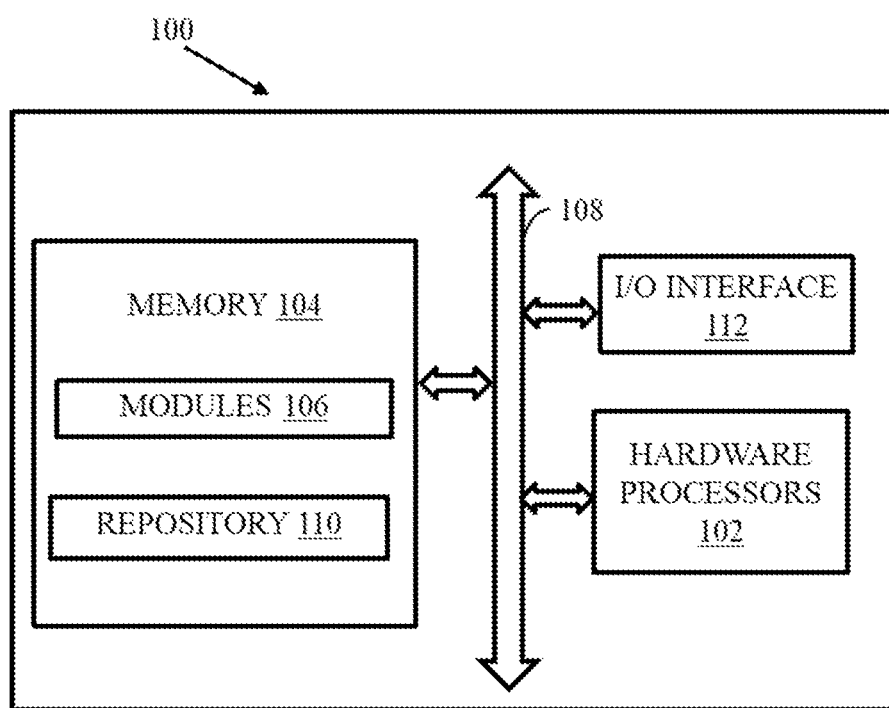
FIG. 1 is a functional block diagram of a system for semi-supervised domain adaptation based universal lesion detection, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

Conventionally, there are two approaches to reduce the domain-gap between source and target domain which is achieved either by image-to image translation or by aligning the feature-space. In image-to-image translation techniques, researchers have utilized networks such as Style Generative Adversarial Networks (GAN), Cycle GAN and the like to generate source images in the style of target images and train a network on the target translated source-images. On the other hand, in feature-space alignment techniques, the feature-space between source and target domain are aligned using either unsupervised adversarial training or prototype alignment.

A naive approach to circumvent domain-shift is to fine-tune a Universal Lesion Detection (ULD) network, trained on source domain, over sufficient labeled target domain samples. However, obtaining requisite number of annotations in every new domain is impractical due to the expensive and time-consuming annotation process. Simple fine-tuning may improve sensitivity on the target domain, but it suffers from performance drop on the source domain which is not desirable in practical scenarios.

Embodiments herein provide a method and system for semi-supervised domain adaptation based universal lesion detection. The present disclosure provides a semi-supervised few-shot adversarial lesion detector network to detect multiple lesions in an accurate manner. The few-shot adversarial lesion detector network is trained using a periodic gradient updation based overfitting aware few-shot learning mechanism. Initially, the system receives an input image, wherein the input image is obtained from a diagnostic medical imaging equipment. Further, a plurality of multi-scale feature maps are extracted from the input image using a Feature Pyramid Network (FPN) based feature extraction framework. After extracting multi-scale feature maps. Further, a classification map is generated based on the plurality of multi-scale feature maps using a Fully Connected Classifier Network (FCCN). The FCCN classifies each of a plurality of pixels associated with each of the plurality of multi-scale feature maps into one of, a) a foreground pixel and b) a background pixel based on a corresponding conditional probability. After classification, a 4D vector corresponding to each of a plurality of foreground pixels is computed using a bounding box regressor network. The 4D vector encodes a location of a bounding box. After computing the 4D vector an objectness score corresponding to each of the plurality of foreground pixels is computed using a Fully Connected Prediction Network (FCPN). After computing 4D vector, a centerness score is computed for each of the plurality of foreground pixels using a single centerness network. The centerness score depends on a distance between the pixel and a center of a corresponding ground truth bounding box. Further, an updated objectness score is computed for each of the plurality of foreground pixels by multiplying a corresponding centerness score with the corresponding predicted objectness score. Finally, a plurality of multi-sized lesions in the input image are detected based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfilling aware few-shot learning mechanism.

Referring now to the drawings, and more particularly to FIGS. 1 through 6B, where similar reference characters denote corresponding features consistently throughout the figures, there are shown preferred embodiments and these embodiments are described in the context of the following exemplary system and/or method.

FIG. 1 is a functional block diagram of a semi-supervised domain adaptation based universal lesion detection, in accordance with some embodiments of the present disclosure. The system 100 includes or is otherwise in communication with hardware processors 102, at least one memory such as a memory 104, an I/O interface 112. The hardware processors 102, memory 104, and the Input/Output (I/O) interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in the memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 104 includes a plurality of modules 106. The memory 104 also includes a data repository (or repository) 110 for storing data processed, received, and generated by the plurality of modules 106.

Figure 5:
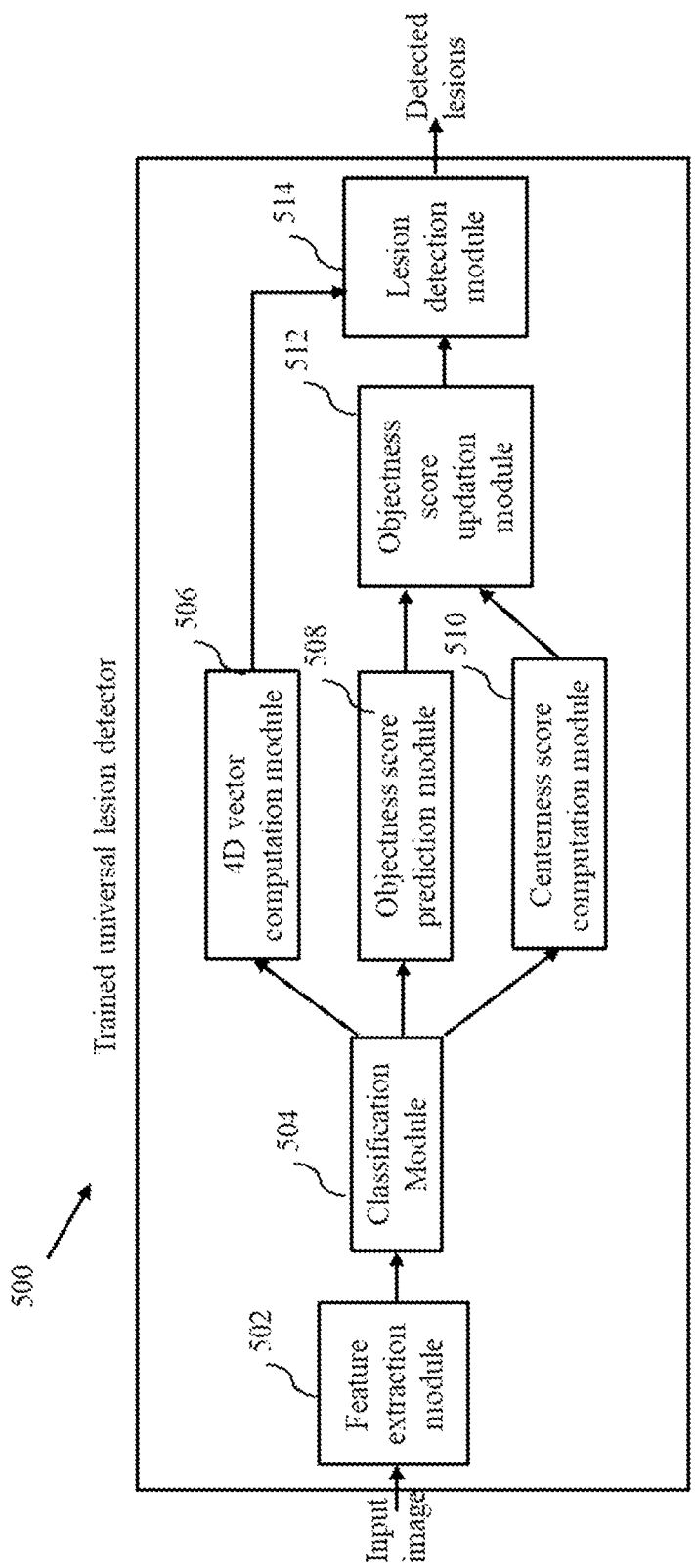
FIG. 5 illustrates a functional architecture of the system of FIG. 1, for semi-supervised domain adaptation based universal lesion detection, in accordance with some embodiments of the present disclosure.

The plurality of modules 106 include programs or coded instructions that supplement applications or functions performed by the system 100 for real time prediction of relative antenna position in the multi-tenant tower. The plurality of modules 106, amongst other things, can include routines, programs, objects, components, and data structures, which performs particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for the semantic navigation using spatial graph and trajectory history. In an embodiment, the modules 106 includes a feature extraction module (shown in FIG. 5), a classification module (shown in FIG. 5), a 4D vector computation module (shown in FIG. 5), an objectness score prediction module (shown in FIG. 5), a centerness score computation module (shown in FIG. 5), and an objectness score updation module (shown in FIG. 5) and a lesion detection module (shown in FIG. 5). In an embodiment, FIG. 5 illustrates a functional architecture of the system of FIG. 1, for semi-supervised domain adaptation based universal lesion detection, in accordance with some embodiments of the present disclosure.

The data repository (or repository) 110 may include a plurality of abstracted piece of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Working of the components of the system 100 is explained with reference to the method steps depicted in FIGS. 2A and 2B and the components depicted in FIG. 3.

Figure 2A:
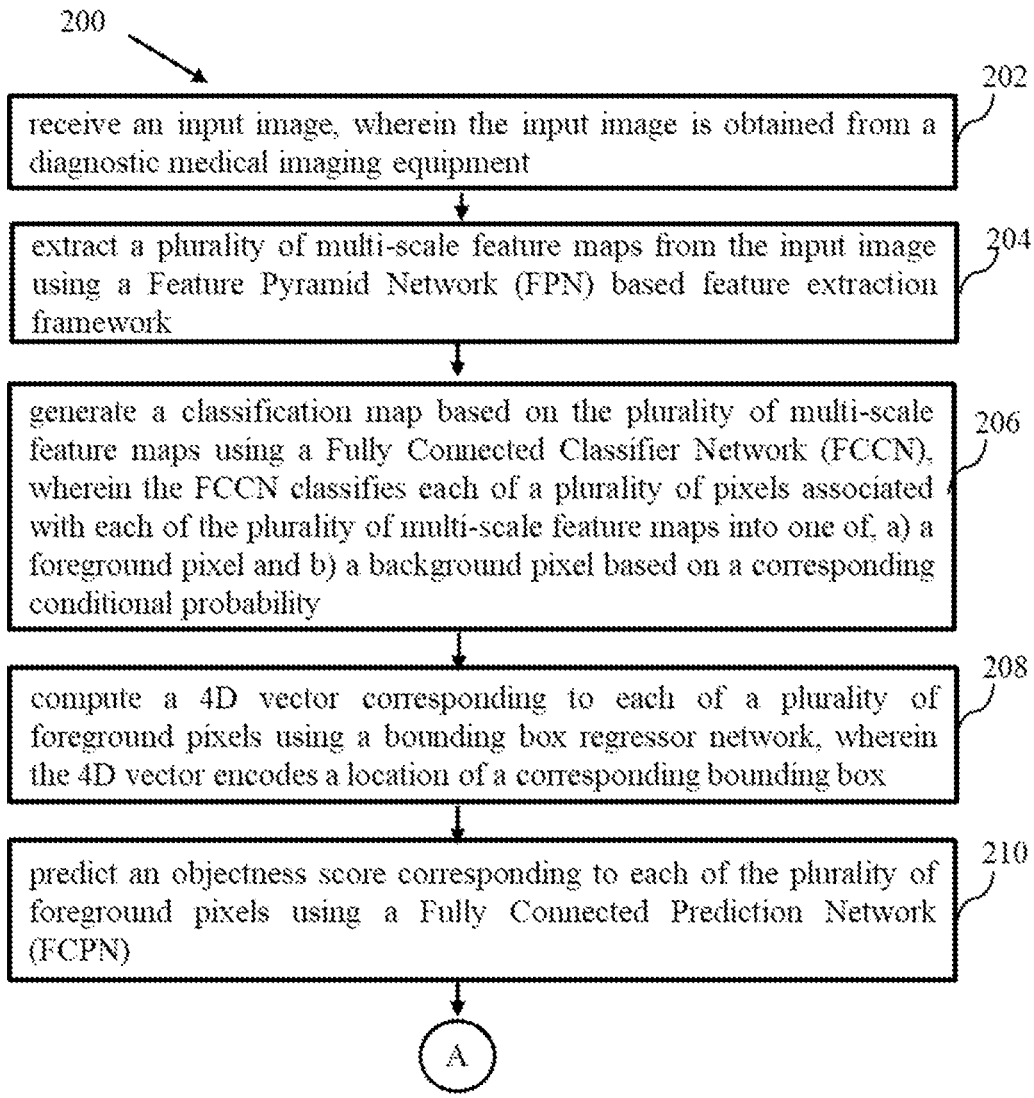
FIGS. 2A and 2B are exemplary flow diagrams illustrating a processor implemented method for semi-supervised domain adaptation based universal lesion detection, implemented by the system of FIG. 1, in accordance with some embodiments of the present disclosure.
Figure 2B:
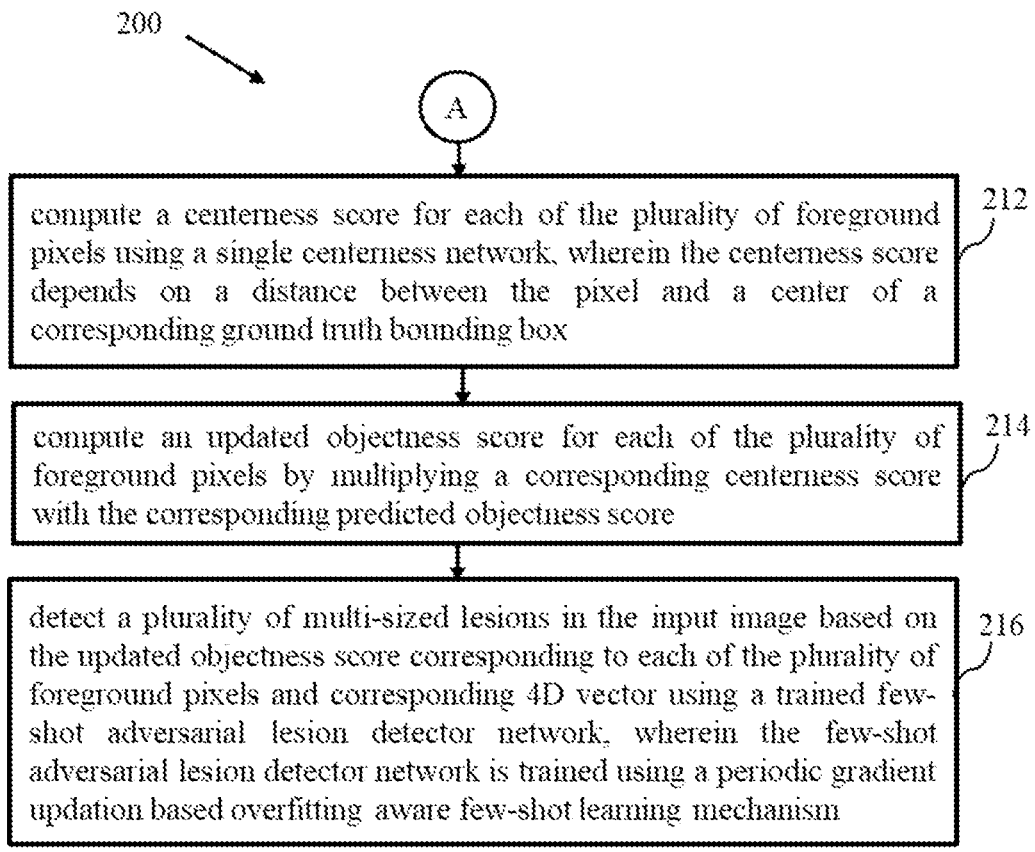

FIGS. 2A and 2B are exemplary flow diagram illustrating a method 200 for semi-supervised domain adaptation based universal lesion detection implemented by the system of FIG. 1 according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of the method 200 of the present disclosure will now be explained with reference to the components or blocks of the system 100 as depicted in FIG. 1 and the steps of flow diagram as depicted in FIGS. 2A and 2B. The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of the method 200, the one or more hardware processors 102 are configured by the programmed instructions to receive the input image X wherein the input image is obtained from the diagnostic medical imaging equipment. The input image X may include one or more objects or lesions to be detected. For example, the diagnostic medical imaging equipment includes radiography, Magnetic Resonance Imaging (MRI), Computed Tomography (CT), fluoroscopy, ultrasound, Echocardiography (ECG), Nuclear medicine like Positron Emission Tomography (PET) and the like.

At step 204 of the method 200, the feature extraction module 502 executed by one or more hardware processors 102 is configured by the programmed instructions to extract the plurality of multi-scale feature maps ($f^i$) at $i^{th}$ Feature Pyramid Network (FPN) level using a convolutional feature-extractor F. A multi-scale feature map includes a plurality of features in a plurality of dimensions.

At step 206 of the method 200, the classification module 504 executed by the one or more hardware processors 102 is configured by the programmed instructions to generate the classification map based on the plurality of multi-scale feature maps ($f^i$) using the FCCN. The FCCN classifies each of a plurality of pixels (x,y) associated with each of the plurality of multi-scale feature maps ($f^i$) into one of, a) the foreground pixel and b) the background pixel based on a corresponding conditional probability ($P_{x,y}$). For example, the pixels with a conditional probability ($P_{x,y}$) greater than a predefined threshold is classified as foreground pixels and the pixels with the conditional probability ($P_{x,y}$) less than the predefined threshold is classified as the background pixels.

At step 208 of the method 200, the 4D vector computation module 506 executed by the one or more hardware processors 102 is configured by the programmed instructions to compute the 4D vector $U_{x,y}$ corresponding to each of a plurality of foreground pixels using the bounding box regressor network. The 4D vector encodes a location of the corresponding bounding box. For example, the 4D vector is (l, t, r, b), which indicates distances from the location to the four sides like left, top, right and bottom.

At step 210 of the method 200, the objectness score prediction module 508 executed by the one or more hardware processors 102 is configured by the programmed instructions to predict the objectness score corresponding to each of the plurality of foreground pixels using the Fully Connected Prediction Network (FCPN). For example, the objectness score is a confidence score of the detection network indicating how confident the network is that a particular pixel belongs to a foreground object.

At step 210 of the method 200, the centerness score computation module 510 executed by the one or more hardware processors 102 is configured by the programmed instructions to compute the centerness score (given in equation 1) for each of the plurality of foreground pixels using the single centerness network. The centerness score depends on a distance between the pixel and a center of a corresponding ground truth bounding box. Further, the centerness score is used to remove the noisy pixels. Hence the pixels that are present near a center of an object are given a higher score and finally this score will be multiplied with the original objectness score.

$$centerness\ score = \sqrt{\frac{\min(l^*, r^*)}{\max(l^*, r^*)} X \frac{\min(t^*, b^*)}{\max(t^*, b^*)}} \quad (1)$$

At step 212 of the method 200, the objectness score updation module 512 executed by the one or more hardware processors 102 is configured by the programmed instructions to compute an updated objectness score for each of the plurality of foreground pixels by multiplying a corresponding centerness score with the corresponding predicted objectness score.

At step 214 of the method 200, the lesion detection module 514 executed by the one or more hardware processors 102 is configured by the programmed instructions to detect a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfilling aware few-shot learning mechanism. The method of training the few-shot adversarial lesion detector network is explained below.

In an embodiment, given a labeled dataset $S=\{(X_s,y_s)\}$ from a source domain $D_S$ and a dataset T from a different but related target domain $D_T$, the dataset T is split into: (i) an unlabeled set $T_U=\{\tilde{X}_t\}$ a and a much smaller labeled set $T_L^{train}=\{(X_t,y_t)\}$ before training. Here, $T=T_U+T_L^{train}$. Both S and T share the same task, i.e., given an input image X, the target is to find the bounding box (Bbox) of the lesion (object) y present in the input image. Therefore, the aim of the present disclosure is to learn a single set of detector model parameters $G_0$, such that the model trained on the source domain $D_S$ and few labeled target domain samples $T_L^{train}$ can work efficiently on an unseen target test-set $T^{test}$ without degradation in lesion detection performance.

Figure 3:
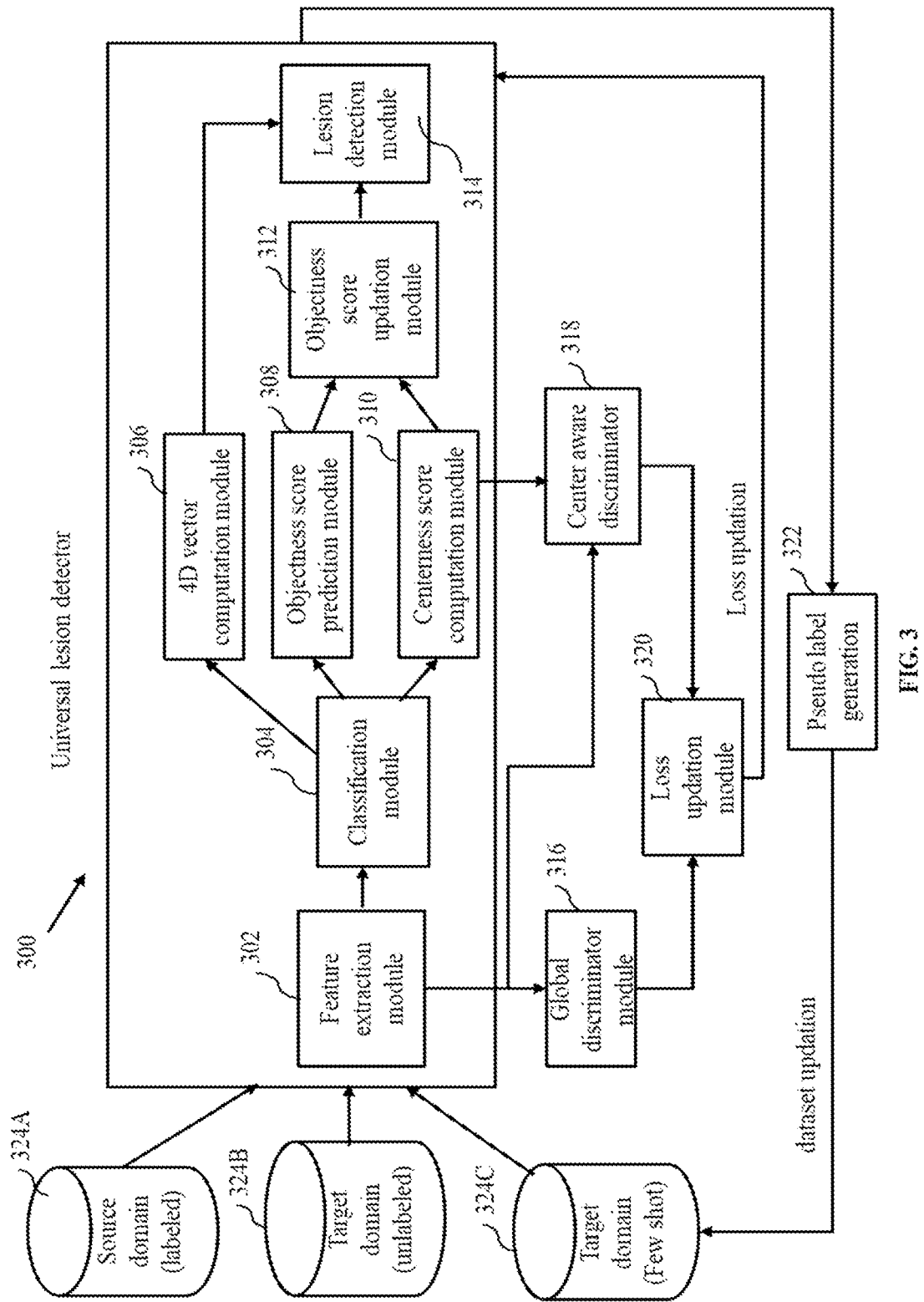
FIG. 3 illustrates a functional architecture for training the semi-supervised domain adaptation based universal lesion detection, implemented by the system of FIG. 1, in accordance with some embodiments of the present disclosure.

FIG. 3 illustrates a functional architecture for training the semi-supervised domain adaptation based universal lesion detection, implemented by the system of FIG. 1, in accordance with some embodiments of the present disclosure. Now referring to FIG. 3, the functional architecture for training includes a feature extraction module 302, a classification module 304, a 4D vector computation module 306, the objectness score prediction module 308, a centerness score computation module 310, an objectness score updation module 312, a lesion detection module 314, a global discriminator 316, a center aware discriminator 318, a loss updation module 320, a pseudo label generation module 422 and a plurality of databases 324A, 324B and 324C.

The feature extraction module 302 receives a labelled dataset pertaining to a source domain S 324 A, an unlabeled dataset pertaining to a target domain $T_U$ 324 B and few labelled dataset pertaining to the target domain $T_L^{train}$ 324C. The source domain and the target domain are distinct and related. Further, the feature extraction module 302 extracts a plurality of multi-scale source feature maps from the labelled dataset pertaining to the source domain, a first plurality of multi-scale target feature maps from the unlabeled dataset pertaining to the target domain and a second plurality of multi-scale target feature maps from the few labelled dataset pertaining to the target domain using the Feature Pyramid Network (FPN).

The classification module 304 generates a classification map based on the plurality of multi-scale source feature maps and the second plurality of multi-scale target feature maps using the FCCN. The FCCN classifies each of a plurality of pixels associated with each of the plurality of multi-scale source feature maps and second plurality of multi-scale target feature maps into one of, a) the foreground pixel and b) the background pixel based on the corresponding conditional probability;

The 4D vector computation module 306 computes the 4D vector $U_{x,y}$, encoding the location of the bounding box, corresponding to each of a plurality of foreground pixels using the bounding box regressor network. The objectness score prediction module 308 predicts the objectness score based on the plurality of foreground pixels using the fully connected layer. The centerness score computation module 310 computes the centerness score for each of the plurality of foreground pixels using the single centerness network. The objectness score updation module 312 computes an updated objectness score for each of the plurality of foreground pixels by multiplying the corresponding centerness score with the corresponding predicted objectness score.

The lesion detection module 314 detects a plurality of lesions based on the updated objectness score and the corresponding 4D vector. Further, an adversarial lesion detector network is trained based on the 4D vector and updated objectness score in a few-shot manner until a minimum supervised loss (given in equation 1) is obtained. Now referring to equation (2), $\mathcal{L}^{sup}$ is the supervised loss function, $L^{det}$ is the loss from the 4D vector computation module and $L^{ctr}$ is the loss from the centerness based objectness score updation module.

$$L^{sup}(X,y)=L^{det}+L^{ctr} \quad (2)$$

In an embodiment, the global discriminator module 316 trains the global discriminator $D_{GA}$ based on the plurality of multi-scale source feature maps and the first plurality of multi-scale target feature maps until a minimum domain prediction loss or binary cross entropy loss $\mathcal{L}_{GA}^{adv}$ is obtained. The global discriminator network is a convolutional neural network comprising a gradient reversal layer to perform adversarial learning. The domain prediction loss aims to identify whether the pixels on $i^{th}$ FPN level feature map $f^i$ belong to the source/target domain. For a location (x,y) on $f^i$, $\mathcal{L}_{GA}^{adv}$ can be defined as given in equation (3).

$$\mathcal{L}_{GA}^{adv}((X_s, \widetilde{X}_t))=-E_{x,y}z\log(D_{GA}(f_s^i)^{x,y})+(1-z)\log(1-D_{GA}(f_t^i)^{x,y}) \quad (3)$$

In an embodiment, the center aware discriminator 318 generating a centre-aware map by multiplying a pixelwise objectness map and an objectness score based centerness map. The pixelwise objectness map is predicted based on the plurality of multi-scale source feature maps and the first plurality of multi-scale target feature maps using the adversarial lesion detector network. The objectness score based centerness map is predicted based on the plurality of multi-scale source feature maps and the first plurality of multi-scale target feature maps using the adversarial lesion detector network. Further, the center-aware discriminator network is trained based on the centre-aware map until the minimum domain prediction loss is obtained. The center-aware discriminator network is the convolutional neural network comprising the gradient reversal layer.

In an embodiment, the domain label z of source and target are 1 and 0, respectively. Further, the adversarial lesion detection network predicts pixel-wise objectness maps $M^{obj}$ and centerness maps $M^{cls}$ which are combined to generate a center aware map $M^{CA}$. The extracted features $f^i$ along with the center aware map $M^{CA}$ are utilized to train another center aware discriminator $D_{CA}$ with the domain prediction loss $\mathcal{L}_{CA}^{adv}$ as given in equation (4) in order to perform center aware alignment in pixel level.

$$\mathcal{L}_{CA}^{adv}(X_s, \widetilde{X}_t)=-E_{x,y}z\log(D_{CA}(M_s^{CA}\odot f_s^i)^{x,y})+(1-z)\log(1-D_{CA}(M_t^{CA}\odot f_t^i)^{x,y}) \quad (4)$$

The Gradient Reversal Layer (GRL) is applied before each discriminator for adversarial learning, which reverses the sign of the gradient while optimizing the detector. The loss for the discriminators is minimized via equation (2) and equation (4), while the detector is optimized by maximizing these loss functions, in order to deceive the discriminator.

The loss updation module 320 updates the adversarial lesion detector network based on a corresponding domain predictions losses associated with the global discriminator network and the center-aware discriminator network. Hence, the overall loss function for unsupervised adversarial lesion detector UDA using $\delta$ and $\gamma$ as balancing weights, can be expressed as given in equation (5).

$$\mathcal{L}^{UDA}(S,T_U)=\mathcal{L}_S^{sup}(X_s,y_s)+\delta\mathcal{L}_{GA}^{adv}(X_s, \widetilde{X}_t)+\gamma\mathcal{L}_{CA}^{adv}(X_s, \widetilde{X}_t) \quad (5)$$

Finally, the few-shot adversarial lesion detector network is obtained by performing a supervised learning on the updated adversarial lesion detector network based on the plurality of multi-scale source feature maps and the second plurality of multi-scale target feature maps using a periodic gradient updation based overfitting aware Few-Shot Learning (FSL).

Pseudocode 1

Input data: Source dataset S and few-shot labeled target dataset $T_L^{train}$, the adversarial lesion detection network $G_\theta$, hyperparameters $\alpha$, $\beta$, and k, n(S), n($T_L^{train}$) wherein, n(S) is the total number of source samples and ($T_L^{train}$) is the total number of labeled target samples.

```
for iterations = 1,2,3....do
    Train-source: Gradients V_θ=G_θ'(S; θ);
    updated parameters: θ' = θ – αV_θ;
```

$$\eta = \frac{n(S)}{n(T_L^{train}) * k};$$

```
    if iterations mod η = 0 do
        Train-target: Gradients V_θ' = G_θ'(T_L^train; θ');
        θ = θ' – βV_θ;
    else
        θ = θ';
```

The few-shot training paradigm as given by Pseudocode 1 aims to regularize the ULD network and enable it to focus more on target domain samples without over-fitting on one particular domain. The idea is to train the adversarial lesion detector G on both domains by alternatively updating their weights so as to ensure balanced updation across source and target samples. This is achieved by finding the best possible gradient direction due to the shared parameter optimization of the two losses. The loss on source train set S is computed using model parameter θ. The loss on the target train set $T_L^{train}$ is computed using shared updated parameter θ'=θ−αV_θ after each n iterations. To avoid overfitting on target domain, we compute η such that K epochs of target are trained when 1 epoch of source is trained. We empirically determined the optimal value of κ=3. The supervised loss function for FSL is defined in equation (6), where $1_\eta$ is an indicator function that takes a value of 1 after each q iteration.

$$\mathcal{L}^{few}(S, T_L^{train}) = \mathcal{L}_S^{sup}(X_s, y_s, \theta) + 1_\eta \mathcal{L}_{T_L^{train}}^{sup}(X_t, y_t, \theta') \quad (6)$$

In an embodiment, the adversarial learning $\mathcal{L}_{CA}^{adv}$ and $\mathcal{L}_{GA}^{adv}$ are applied over source and target domain for feature alignment with the proposed FSL ($L^{few}$) on the combined domain. This helps in increasing the similarity between the two domains via feature-alignment and also widens the knowledge space of ULD by incorporating information from the target domain in the form of few-shot labeled samples. The loss function for few-shot adversarial lesion detector network (FDA) is defined as given in equation (7).

$$\mathcal{L}^{FDA}(S, T_U, T_L^{train}) = L^{few}(X_s, X_t, y_s, y_t) + \delta \mathcal{L}_{GA}^{adv}(X_s, \tilde{X}_t) \gamma \mathcal{L}_{CA}^{adv}(X_s, \tilde{X}_t) \quad (7)$$

Figure 4:
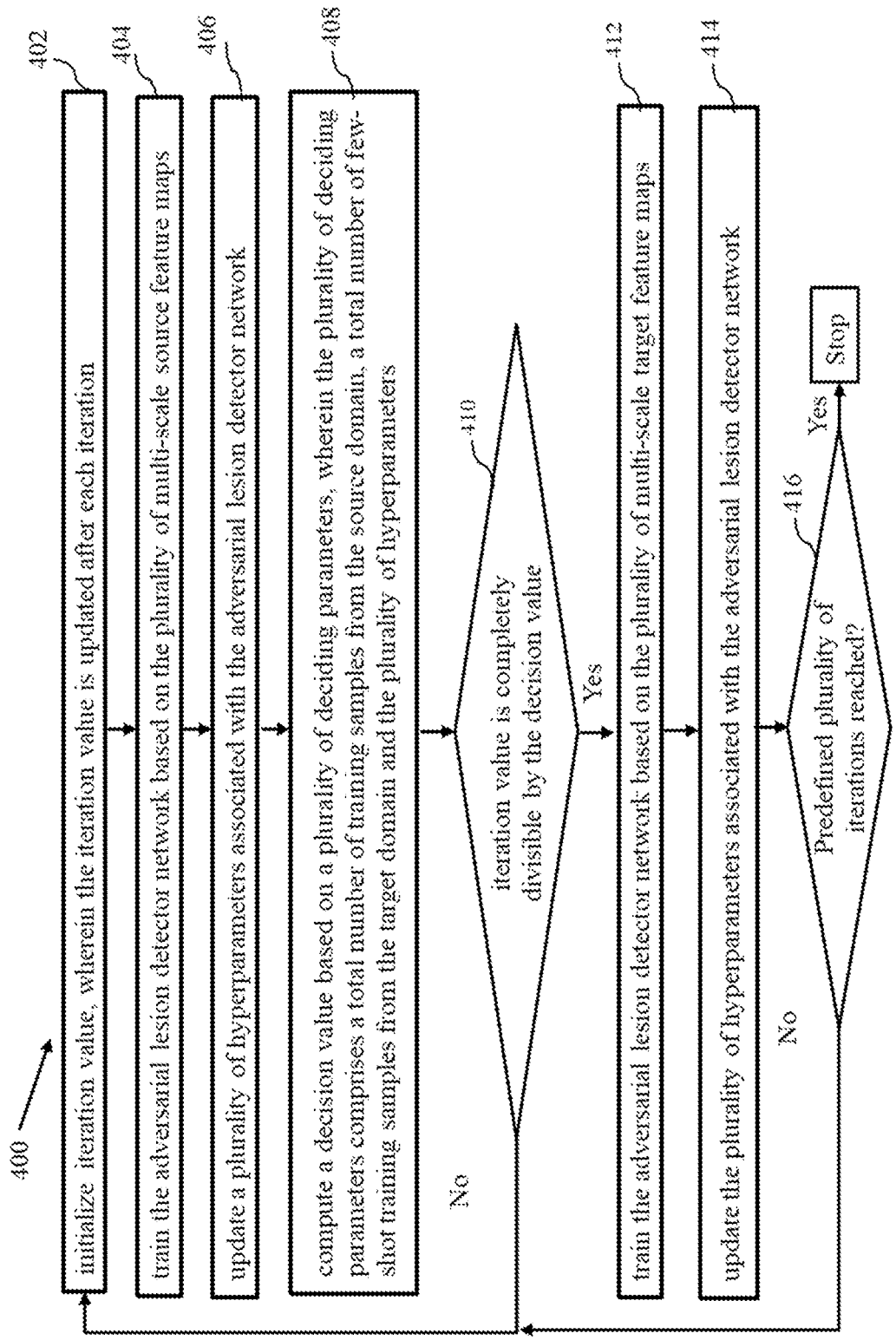
FIG. 4 is an exemplary flow diagram illustrating a processor implemented method for periodic gradient updation based overfilling aware few-shot learning mechanism, implemented by the system of FIG. 1, in accordance with some embodiments of the present disclosure.

FIG. 4 is an exemplary flow diagram illustrating a processor implemented method for periodic gradient updation based overfitting aware few-shot learning mechanism, implemented by the system of FIG. 1, in accordance with some embodiments of the present disclosure. Now referring to FIG. 4, at step 402 of the method 400, an iteration value is initialized. The iteration value is updated after each iteration. At step 404 of the method 400, the adversarial lesion detector network is trained based on the plurality of multi-scale source feature maps. At step 406 of the method 400, a plurality of hyperparameters associated with the adversarial lesion detector network are updated. At step 408 of the method 400, a decision value is computed based on a plurality of deciding parameters. For example, the plurality of deciding parameters includes a total number of training samples from the source domain, a total number of few-shot training samples from the target domain and the plurality of hyperparameters. At step 410 of the method 400, it is checked whether the iteration value is completely divisible by the decision value. If so, the adversarial lesion detector network is trained based on the plurality of multi-scale target feature maps at step 412. If it is not completely divisible by the decision value, the step 402 is executed. At step 414 of the method 400, the plurality of hyperparameters associated with the adversarial lesion detector network are updated. Finally, at step 416 of the method 418, it is checked whether, the iteration value has reached a predefined iteration number. If so, the method stops, otherwise, the step 402 and the further steps are repeated.

The pseudo label generation module 422 initially generates a plurality of pseudo-labels based on the unlabeled dataset pertaining to the target domain using few-shot adversarial lesion detector network. Each of the plurality of pseudo-labels includes a corresponding 4D vector and an objectness score. Further, a plurality of confident pseudo-labels are selected from the plurality of pseudo-labels based on a predefined confidence threshold. The plurality of pseudo-labels with the corresponding objectness score greater than the predefined confidence threshold are selected. Finally, the labelled dataset pertaining to the target domain is updated with the plurality of confident pseudo-labels. The few-shot adversarial lesion detector network is further trained using the updated labelled dataset pertaining to the target domain.

For example, as unlabeled samples $T_U$ of target domain are available in abundance, hence the present disclosure proposes a self-supervised learning mechanism to further improve the ULD performance on T by expanding the few-shot labeled sample space for T. Here, we obtain Bbox predictions ($\tilde{y}_t$), having confidence-score above a detection threshold (τ), on unlabeled target samples $\tilde{X}_t$ by applying the few-shot adapted UDA network. Hence, the present disclosure generates pseudo samples ($T_P = \{X_t, \tilde{y}_t\}$) to further fine-tune the FDA network in a semi-supervised manner using ($\mathcal{L}_{T_P}^{semi}$) (defined in equation (8)) on target domain.

$$\mathcal{L}_{T_P}^{semi} = \mathcal{L}^{sup}(\tilde{X}_t, \tilde{y}_t) \quad (8)$$

The ULD network G has been trained on source samples (S) and the source domain weights are used for initializing the few-shot adversarial lesion detection network of the present disclosure. For domain adaptation on T, the adversarial lesion detector G and discriminators $D_{GA}$ and $D_{CA}$ are trained initially via the FDA training method using loss defined in equation (7). Subsequently, the detector G is applied on unlabeled target images $\tilde{X}_t$ and generate pseudo-labels ($T_P = \{\tilde{X}_t, y_t\}$). Next, the ULD network is trained using the semi-supervised loss defined in equation (8). Hence, the final objective loss-function of the trained few-shot adversarial lesion detector network using hyper-parameters δ, γ, η, & λ is as given in equation 9.

$$\mathcal{L}^{TiLDDA}\left(S, T_U, T_L^{train}, T_P\right) = \mathcal{L}_S^{sup}(S, \theta) + \delta\mathcal{L}_{GA}^{adv}(X_s, \tilde{X}_t) + \quad (9)$$
$$\gamma\mathcal{L}_{CA}^{adv}(X_s, \tilde{X}_t) + 1_\eta \mathcal{L}_{T_L^{train}}^{sup}\left(T_L^{train}, \theta'\right) + \lambda\mathcal{L}_{T_P}^{semi}(T_P, \theta')\bigg]$$

In an embodiment, the performance of the present disclosure has been evaluated on lesion detection from CT-scan images pertaining to a plurality of target domain datasets KITS (Kidney Tumor Segmentation), LiTS (Liver Tumor Segmentation) and 3Dircadb (3D image reconstruction for comparison of algorithm database). Based on the evaluation, it has been observed that there is a remarkable improvement (12% to 35%) in lesion detection using the few-shot adversarial lesion detector network with very few labeled target samples.

In an embodiment, the experimentation set up of the present disclosure is given as follows: The feature extractor F is composed of ResNet-101 backbone along with 5 FPN levels and the fully-convolutional block B consists of 3 branches for classification, regression and centerness computations. For robust performance of the present disclosure, the feature alignment is done across all FPN levels. The present disclosure was implemented in PyTorch-1.4 and trained in a NVIDIA V 100 16 GB GPU using a batch-size of 4. For all experiments, the values of κ, δ, γ, λ, and τ are set as 3, 0.01, 0.1, 0.5, and 0.7, respectively. The weights used in GRL for adversarial training are set to 0.01 and 0.02 for $D_{GA}$ and $D_{CA}$, respectively. The adversarial lesion detection network G is initialized using weights learned via pre-training on source S. An SGD optimizer is used to train FDA network with a learning rate of $e^{-3}$ and decay-factor of 10.

In an embodiment, a publicly available multi-organ lesion detection dataset is used as source domain for training. The source training dataset includes 32,000 annotated or labeled lesions from 10,594 CT scans of 4, 427 unique patients or subjects having 1 to 3 lesion bounding boxes annotated by radiologists. A sample target training and testing dataset is given in Table I.

TABLE I

| | Data Split | No. of patients | No. of Images | No. of Lesions |
|---|---|---|---|---|
| KiTS (230 patients) | $T_U^{train}$ | 180 | 3194 | 4083 |
| | $T_L^{train}$ | 10 | 919 | 1305 |
| | $T^{test}$ | 40 | 923 | 949 |
| LiTS (130 patients) | $T_U^{train}$ | 80 | 4270 | 11932 |
| | $T_L^{train}$ | 10 | 847 | 2342 |
| | $T^{test}$ | 40 | 2073 | 4571 |
| 3Dircadb (15 patients) | $T_U^{train}$ | 4 | 144 | 430 |
| | $T_L^{train}$ | 3 | 113 | 163 |
| | $T^{test}$ | 8 | 311 | 676 |

Further, an ablation-study was performed on the present disclosure on $T_{LiTS}^{test}$ dataset and the results are shown in Table II. Now referring to Table II, the Table II includes number of patients, the number of few-shot labeled samples (Train) of LiTS dataset and hyper-parameter κ used in Algorithm 1. It was observed from the Table I that 10 is the optimal number of few-shot labeled samples to obtain best performance. As the combined data in few-shot learning is dominated by source samples, so the network is trained on target samples for ore number of epochs as compared to source domain using different values of κ and found that a value of 3 is optimal that avoids the model from over-fitting over target domain.

TABLE II

| No of patients | $n(T_L^{train})$ | k | Sensitivity (%) |
|---|---|---|---|
| 1 | 81 | 1 | 46.3 |
| 5 | 428 | 1 | 50.3 |
| 10 | 847 | 1 | 51.4 |
| | | 3 | 53.8 |
| | | 5 | 53.3 |

The present disclosure has been tested and the detection sensitivity of the present disclosure has been compared with the existing techniques. There is a significant improvement in the detection sensitivity of the present disclosure compared to the prior arts. The significant improvement in the detection sensitivity is achieved through the unique training mechanism.

Figure 6A:
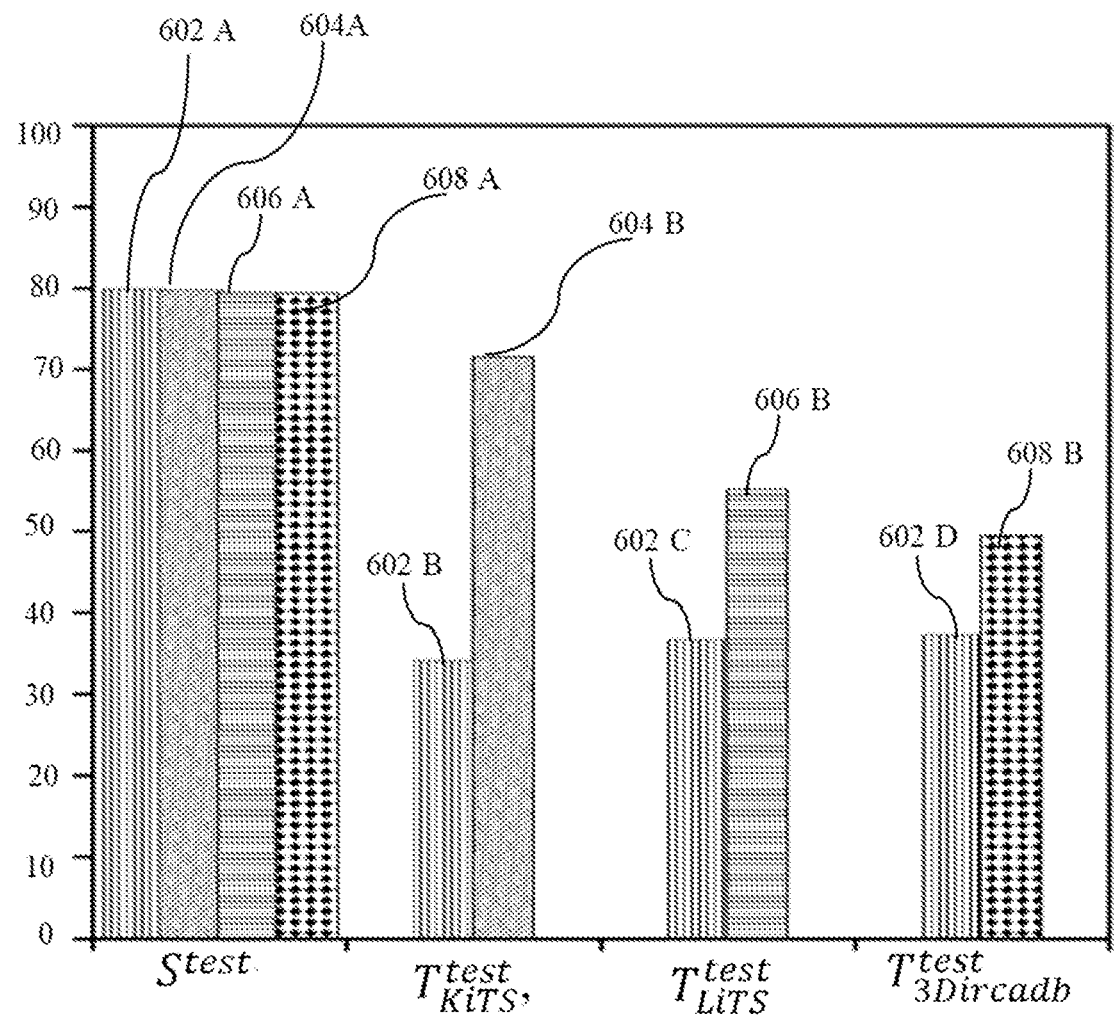
FIGS. 6A and 6B illustrate experimentation results for semi-supervised domain adaptation based universal lesion detection, in accordance with some embodiments of the present disclosure.

Further, FIG. 6A illustrates a comparison of detection-sensitivity on test-set of S and T datasets before and after applying few-shot adversarial lesion detector network. For example, referring to FIG. 6A, x-axis indicates various datasets, and the y-axis indicates the detection accuracy.

For example, here DeepLesion (DL) data is the source domain having test dataset Stent and there are three target domains ($T_{KiTS}^{test}$, $T_{LiTS}^{test}$ and $T_{3Dircadb}^{test}$). Bars 602 A indicates the detection sensitivity value on source test dataset evaluated using model trained with source data only. Bars 602 B indicates the detection sensitivity value on KiTS test dataset evaluated using model trained with source data only. Bar 602 C indicates the detection sensitivity value on LiTS test dataset evaluated using model trained with source data only. Bar 602 D indicates the detection sensitivity value on 3Dircadb test dataset evaluated using model trained with source data only and bar 604 A indicates detection sensitivity on source test dataset using model trained with domain adaptation having KiTS as target domain. Bar 606 A indicates detection sensitivity on source test dataset using model trained with domain adaptation having LiTS as target domain. Bar 608 A indicates detection sensitivity on source test dataset using model trained with domain adaptation having 3Dircadb as target domain. Bar 604 B indicates detection sensitivity on KiTS test dataset using model trained with domain adaptation having KiTS as target domain. Bar 606 B indicates detection sensitivity on LiTS test dataset using model trained with domain adaptation having LiTS as target domain. Bar 608 B indicates detection sensitivity on 3Dircadb test dataset using model trained with domain adaptation having 3Dircadb as target domain, where the domain adaption training scheme is trained using present disclosure.

It is observed that even after domain adaptation, the detection sensitivity of the source domain is maintained and sensitivity value for each target domain test dataset is increased after using domain adaptation used in present disclosure.

Figure 6B:
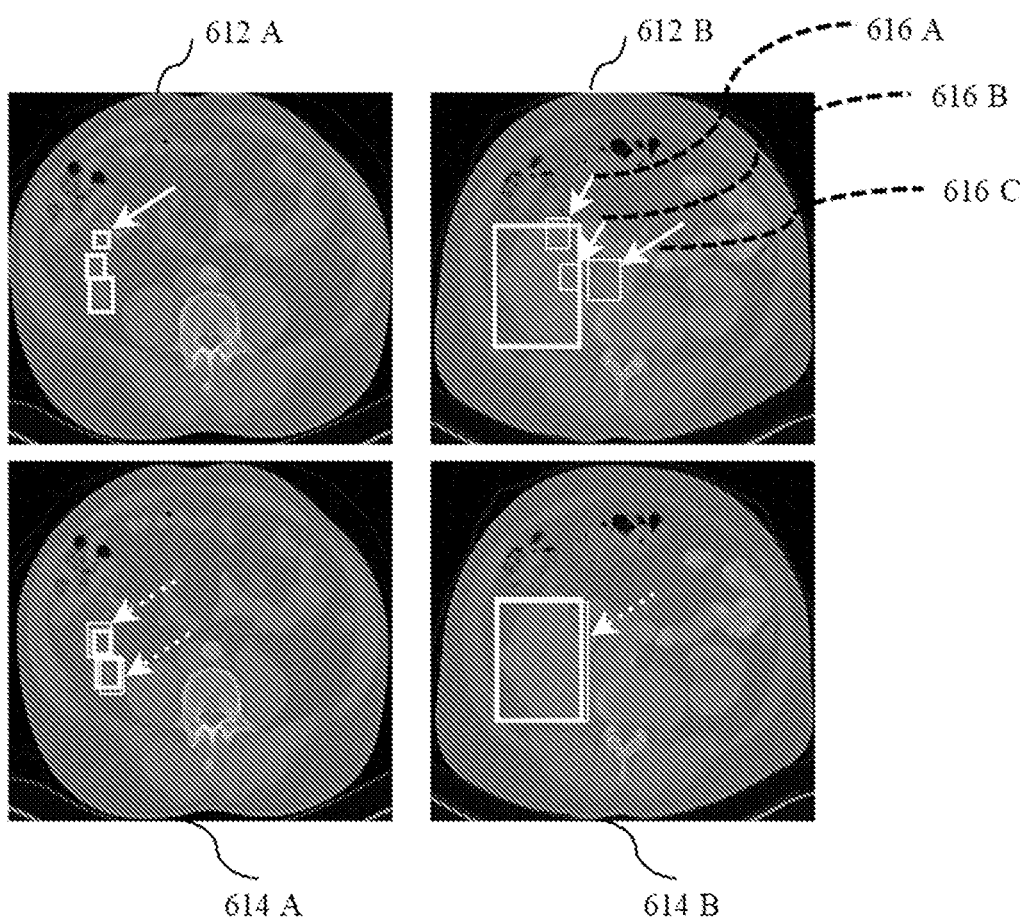

FIG. 6B illustrates the qualitative improvement for lesion detection of the present disclosure. Now referring to FIG. 6B, lesion detection outputs 612 A and 612 B are the outputs obtained using model trained on only labeled source dataset. Further, 614 A and 614 B are the lesion detection outputs obtained by the present disclosure trained using few-shot adversarial manner using labeled source dataset, unlabeled target dataset and few labeled target datasets. Image used in 612 A and 614 A are same, similarly for 612 B and 614 B. The boxes with solid arrows in the diagram are used to indicate the false detection, boxes with dashed arrow is used to represent the positive detection, rest of the boxes are ground truth boxes. It is observed from FIG. 6B, that the accuracy of the present disclosure has been improved. For example, in the output 612 B, there are false positive lesion detections by the convolutional approaches which are indicated by 616 A, 616 B, 626 C. However, the lesion is accurately identified by the present disclosure as shown in 614 B.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address the unresolved problem of accurate detection of lesions using unlabeled or few labeled target datasets given a labelled source dataset. The bias and overfitting problems are overcome using a novel periodic gradient updation based overfitting aware few-shot learning mechanism.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, the method comprising:

receiving, by one or more hardware processors, an input image, wherein the input image is obtained from a diagnostic medical imaging equipment;

extracting, by the one or more hardware processors, a plurality of multi-scale feature maps from the input image using a Feature Pyramid Network (FPN) based feature extraction framework;

generating, by the one or more hardware processors, a classification map based on the plurality of multi-scale feature maps using a Fully Connected Classifier Network (FCCN), wherein the FCCN classifies each of a plurality of pixels associated with each of the plurality of multi-scale feature maps into one of, a) a foreground pixel, and b) a background pixel based on a corresponding conditional probability;

computing, by the one or more hardware processors, a 4D vector corresponding to each of a plurality of foreground pixels using a bounding box regressor network, wherein the 4D vector encodes a location of a corresponding bounding box;

predicting, by the one or more hardware processors, an objectness score corresponding to each of the plurality of foreground pixels using a Fully Connected Prediction Network (FCPN), wherein the objectness score is a confidence score for being one of, the foreground pixel and the background pixel;

computing, by the one or more hardware processors, a centerness score for each of the plurality of foreground pixels using a single centerness network, wherein the centerness score represents a distance between the pixel and a center of a corresponding ground truth bounding box;

computing, by the one or more hardware processors, an updated objectness score for each of the plurality of foreground pixels by multiplying a corresponding centerness score with the corresponding predicted objectness score; and detecting, by the one or more hardware processors, a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfitting aware few-shot learning mechanism.

2. The processor implemented method of claim 1, wherein the few-shot adversarial lesion detector network is trained by:

receiving a labelled dataset pertaining to a source domain, an unlabelled dataset pertaining to a target domain, and a labelled dataset pertaining to the target domain, wherein the source domain and the target domain are distinct and related;

extracting a plurality of multi-scale source feature maps from the labelled dataset pertaining to the source domain using the Feature Pyramid Network (FPN);

extracting a first plurality of multi-scale target feature maps from the unlabelled dataset pertaining to the target domain using the Feature Pyramid Network (FPN);

extracting a second plurality of multi-scale target feature maps from the labelled dataset pertaining to the target domain using the Feature Pyramid Network (FPN);

generating a classification map based on the plurality of multi-scale source feature maps and the second plurality of multi-scale target feature maps using the FCCN, wherein the FCCN classifies each of a plurality of pixels associated with each of the plurality of multi-scale source feature maps and second plurality of multi-scale target feature maps into one of, a) the foreground pixel, and b) the background pixel based on the corresponding conditional probability;

generating the 4D vector corresponding to each of a plurality of foreground pixels using the bounding box regressor network;

computing an updated objectness score for each of the plurality of foreground pixels by multiplying a corresponding centerness score with a corresponding predicted objectness score, wherein the objectness score is predicted based on the plurality of foreground pixels using the fully connected layer and, wherein the centerness score is computed for each of the plurality of foreground pixels using the single centerness network;

training an adversarial lesion detector network based on the 4D vector and updated objectness score in a few-shot manner until a minimum supervised loss is obtained;

training a global discriminator network based on the plurality of multi-scale source feature maps and the first plurality of multi-scale target feature maps until a minimum domain prediction loss is obtained, wherein the global discriminator network is a convolutional neural network comprising a gradient reversal layer;

generating a centre-aware map by multiplying a pixelwise objectness map and an objectness score based centerness map;

training a center-aware discriminator network based on the centre-aware map until a minimum domain prediction loss is obtained, wherein the center-aware discriminator network is the convolutional neural network comprising the gradient reversal layer;

updating the adversarial lesion detector network based on a corresponding domain predictions losses associated with the global discriminator network and the center-aware discriminator network; and obtaining the few-shot adversarial lesion detector network by performing a supervised learning on the updated adversarial lesion detector network based on the plurality of multi-scale source feature maps and the second plurality of multi-scale target feature maps using a periodic gradient updation based overfitting aware few-shot learning mechanism.

3. The processor implemented method of claim 2, wherein obtaining the few-shot adversarial lesion detector network by performing the supervised learning on the updated adversarial lesion detector network based on the plurality of multi-scale source feature maps and the second plurality of multi-scale target feature maps using a periodic gradient updation based overfitting aware few-shot learning mechanism comprises:

repeatedly performing for a predefined plurality of iterations:
  initializing an iteration value, wherein the iteration value is updated after each iteration of the plurality of iterations;
  training the adversarial lesion detector network based on the plurality of multi-scale source feature maps;
  updating a plurality of hyperparameters associated with the adversarial lesion detector network;
  computing a decision value based on a plurality of deciding parameters, wherein the plurality of deciding parameters comprises a total number of training samples from the source domain, a total number of few-shot training samples from the target domain and the plurality of hyperparameters;
  training the adversarial lesion detector network based on the plurality of multi-scale target feature maps if the iteration value is completely divisible by the decision value, wherein iteration value updation and training of the adversarial lesion detector network is performed if the iteration value is not completely divisible by the decision value; and
  updating the plurality of hyperparameters associated with the adversarial lesion detector network.

4. The processor implemented method of claim 2, wherein generating the centre-aware map based on the pixelwise objectness map and the objectness score based centerness map comprises:

predicting the pixelwise objectness map based on the plurality of multi-scale source feature maps and the first plurality of multi-scale target feature maps using the adversarial lesion detector network;

predicting an objectness score based centerness map based on the plurality of multi-scale source feature maps and the first plurality of multi-scale target feature maps using the adversarial lesion detector network; and generating the centre-aware map by multiplying the pixelwise objectness map and the objectness score based centerness map.

5. The processor implemented method of claim 1, further comprising a pseudo label generation by:

generating a plurality of pseudo-labels based on the unlabelled dataset pertaining to the target domain using few-shot adversarial lesion detector network, wherein each of the plurality of pseudo-labels comprises a corresponding 4D vector and an objectness score;

selecting a plurality of confident pseudo-labels from the plurality of pseudo-labels based on a predefined confidence threshold, wherein the plurality of pseudo-labels with the corresponding abjectness score greater than the predefined confidence threshold are selected; and updating the labelled dataset pertaining to the target domain with the plurality of confident pseudo-labels, wherein the few-shot adversarial lesion detector network is further trained using the updated labelled dataset pertaining to the target domain.

6. A system comprising:

at least one memory storing programmed instructions;

one or more Input/Output (I/O) interfaces; and one or more hardware processors operatively coupled to the at least one memory, wherein the one or more hardware processors are configured by the programmed instructions to:

receive an input image, wherein the input age is obtained from a diagnostic medical imaging equipment;

extract a plurality of multi-scale feature maps from the input image using a Feature Pyramid Network (FPN) based feature extraction framework;

generate a classification map based on the plurality of multi-scale feature maps using a Fully Connected Classifier Network (FCCN), wherein the FCCN classifies each of a plurality of pixels associated with each of the plurality of multi-scale feature maps into one of, a) a foreground pixel, and b) a background pixel based on a corresponding conditional probability;

compute a 4D vector corresponding to each of a plurality of foreground pixels using a bounding box regressor network, wherein the 4D vector encodes a location of a corresponding bounding box;

predict an objectness score corresponding to each of the plurality of foreground pixels using a Fully Connected Prediction Network (FCPN), wherein the objectness score is a confidence score for being one of, the foreground pixel and the background pixel;

compute a centerness score for each of the plurality of foreground pixels using a single centerness network, wherein the centerness score represents a distance between the pixel and a center of a corresponding ground truth bounding box;

compute an updated objectness score for each of the plurality of foreground pixels by multiplying a corresponding centerness score with the corresponding predicted objectness score; and detect a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfitting aware few-shot learning mechanism.

7. The system of claim 6, wherein the few-shot adversarial lesion detector network is trained by:

receiving a labelled dataset pertaining to a source domain, an unlabelled dataset pertaining to a target domain, and a labelled dataset pertaining to the target domain, wherein the source domain and the target domain are distinct and related;

extracting a plurality of multi-scale source feature maps from the labelled dataset pertaining to the source domain using the Feature Pyramid Network (FPN);

extracting a first plurality of multi-scale target feature maps from the unlabelled dataset pertaining to the target domain using the Feature Pyramid Network (FPN);

extracting a second plurality of multi-scale target feature maps from the labelled dataset pertaining to the target domain using the Feature Pyramid Network (FPN);

generating a classification map based on the plurality of multi-scale source feature maps and the second plurality of multi-scale target feature maps using the FCCN, wherein the FCCN classifies each of a plurality of pixels associated with each of the plurality of multi-scale source feature maps and second plurality of multi-scale target feature maps into one of, a) the foreground pixel, and b) the background pixel based on the corresponding conditional probability;

generating the 4D vector corresponding to each of a plurality of foreground pixels using the bounding box regressor network;

computing an updated objectness score for each of the plurality of foreground pixels by multiplying a corresponding centerness score with a corresponding predicted objectness score, wherein the objectness score is predicted based on the plurality of foreground pixels using the fully connected layer and, wherein the centerness score is computed for each of the plurality of foreground pixels using the single centerness network;

training an adversarial lesion detector network based on the 4D vector and updated objectness score in a few-shot manner until a minimum supervised loss is obtained;

training a global discriminator network based on the plurality of multi-scale source feature maps and the first plurality of multi-scale target feature maps until a minimum domain prediction loss is obtained, wherein the global discriminator network is a convolutional neural network comprising a gradient reversal layer;

generating a centre-aware map by multiplying a pixelwise objectness map and an objectness score based centerness map;

training a center-aware discriminator network based on the centre-aware map until a minimum domain prediction loss is obtained, wherein the center-aware discriminator network is the convolutional neural network comprising the gradient reversal layer;

updating the adversarial lesion detector network based on a corresponding domain predictions losses associated with the global discriminator network and the center-aware discriminator network; and obtaining the few-shot adversarial lesion detector network by performing a supervised learning on the updated adversarial lesion detector network based on the plurality of multi-scale source feature maps and the second plurality of multi-scale target feature maps using a periodic gradient updation based overfitting aware few-shot learning mechanism.

8. The system of claim 7, wherein obtaining the few-shot adversarial lesion detector network by performing the supervised learning on the updated adversarial lesion detector network based on the plurality of multi-scale source feature maps and the second plurality of multi-scale target feature maps using a periodic gradient updation based overfitting aware few-shot learning mechanism comprises:

repeatedly performing for a predefined plurality of iterations:
  initializing an iteration value, wherein the iteration value is updated after each iteration of the plurality of iterations;
  training the adversarial lesion detector network based on the plurality of multi-scale source feature maps;
  updating a plurality of hyperparameters associated with the adversarial lesion detector network;
  computing a decision value based on a plurality of deciding parameters, wherein the plurality of deciding parameters comprises a total number of training samples from the source domain, a total number of few-shot training samples from the target domain and the plurality of hyperparameters;
  training the adversarial lesion detector network based on the plurality of multi-scale target feature maps if the iteration value is completely divisible by the decision value, wherein iteration value updation and training of the adversarial lesion detector network is performed if the iteration value is not completely divisible by the decision value; and
  updating the plurality of hyperparameters associated with the adversarial lesion detector network.

9. The system of claim 7, wherein generating the centre-aware map based on the pixelwise objectness map and the objectness score based centerness map comprises:
  predicting the pixelwise objectness map based on the plurality of multi-scale source feature maps and the first plurality of multi-scale target feature maps using the adversarial lesion detector network;
  predicting an objectness score based centerness map based on the plurality of multi-scale source feature maps and the first plurality of multi-scale target feature maps using the adversarial lesion detector network; and
  generating the centre-aware map by multiplying the pixelwise objectness map and the objectness score based centerness map.

10. The system of claim 6, further comprising a pseudo label generation by:
  generating a plurality of pseudo-labels based on the unlabelled dataset pertaining to the target domain using few-shot adversarial lesion detector network, wherein each of the plurality of pseudo-labels comprises a corresponding 4D vector and an objectness score;
  selecting a plurality of confident pseudo-labels from the plurality of pseudo-labels based on a predefined confidence threshold, wherein the plurality of pseudo-labels with the corresponding abjectness score greater than the predefined confidence threshold are selected; and
  updating the labelled dataset pertaining to the target domain with the plurality of confident pseudo-labels, wherein the few-shot adversarial lesion detector network is further trained using the updated labelled dataset pertaining to the target domain.

11. One or more non-transitory machine readable information storage mediums comprising one or more instructions which when executed by one or more hardware processors causes:
  receiving an input image, wherein the input image is obtained from a diagnostic medical imaging equipment;
  extracting a plurality of multi-scale feature maps from the input image using a Feature Pyramid Network (FPN) based feature extraction framework;
  generating a classification map based on the plurality of multi-scale feature maps using a Fully Connected Classifier Network (FCCN), wherein the FCCN classifies each of a plurality of pixels associated with each of the plurality of multi-scale feature maps into one of, a) a foreground pixel, and b) a background pixel based on a corresponding conditional probability;
  computing, by the one or more hardware processors, a 4D vector corresponding to each of a plurality of foreground pixels using a bounding box regressor network, wherein the 4D vector encodes a location of a corresponding bounding box;
  predicting an objectness score corresponding to each of the plurality of foreground pixels using a Fully Connected Prediction Network (FCPN), wherein the objectness score is a confidence score for being one of, the foreground pixel and the background pixel;
  computing a centerness score for each of the plurality of foreground pixels using a single centerness network, wherein the centerness score represents a distance between the pixel and a center of a corresponding ground truth bounding box;
  computing an updated objectness score for each of the plurality of foreground pixels by multiplying a corresponding centerness score with the corresponding predicted objectness score; and
  detecting a plurality of multi-sized lesions in the input image based on the updated objectness score corresponding to each of the plurality of foreground pixels and corresponding 4D vector using a trained few-shot adversarial lesion detector network, wherein the few-shot adversarial lesion detector network is trained using a periodic gradient updation based overfitting aware few-shot learning mechanism.

12. The one or more non-transitory machine readable information storage mediums of claim 11, wherein the few-shot adversarial lesion detector network is trained by:
  receiving a labelled dataset pertaining to a source domain, an unlabelled dataset pertaining to a target domain, and a labelled dataset pertaining to the target domain, wherein the source domain and the target domain are distinct and related;
  extracting a plurality of multi-scale source feature maps from the labelled dataset pertaining to the source domain using the Feature Pyramid Network (FPN);
  extracting a first plurality of multi-scale target feature maps from the unlabelled dataset pertaining to the target domain using the Feature Pyramid Network (FPN);
  extracting a second plurality of multi-scale target feature maps from the labelled dataset pertaining to the target domain using the Feature Pyramid Network (FPN);
  generating a classification map based on the plurality of multi-scale source feature maps and the second plurality of multi-scale target feature maps using the FCCN, wherein the FCCN classifies each of a plurality of pixels associated with each of the plurality of multi-scale source feature maps and second plurality of multi-scale target feature maps into one of, a) the foreground pixel, and b) the background pixel based on the corresponding conditional probability;
  generating the 4D vector corresponding to each of a plurality of foreground pixels using the bounding box regressor network;
  computing an updated objectness score for each of the plurality of foreground pixels by multiplying a corresponding centerness score with a corresponding predicted objectness score, wherein the objectness score is predicted based on the plurality of foreground pixels using the fully connected layer and, wherein the centerness score is computed for each of the plurality of foreground pixels using the single centerness network;

training an adversarial lesion detector network based on the 4D vector and updated objectness score in a few-shot manner until a minimum supervised loss is obtained;

training a global discriminator network based on the plurality of multi-scale source feature maps and the first plurality of multi-scale target feature maps until a minimum domain prediction loss is obtained, wherein the global discriminator network is a convolutional neural network comprising a gradient reversal layer;

generating a centre-aware map by multiplying a pixelwise objectness map and an objectness score based centerness map;

training a center-aware discriminator network based on the centre-aware map until a minimum domain prediction loss is obtained, wherein the center-aware discriminator network is the convolutional neural network comprising the gradient reversal layer;

updating the adversarial lesion detector network based on a corresponding domain predictions losses associated with the global discriminator network and the center-aware discriminator network; and obtaining the few-shot adversarial lesion detector network by performing a supervised learning on the updated adversarial lesion detector network based on the plurality of multi-scale source feature maps and the second plurality of multi-scale target feature maps using a periodic gradient updation based overfitting aware few-shot learning mechanism.

13. The one or more non-transitory machine readable information storage mediums of claim 12, wherein obtaining the few-shot adversarial lesion detector network by performing the supervised learning on the updated adversarial lesion detector network based on the plurality of multi-scale source feature maps and the second plurality of multi-scale target feature maps using a periodic gradient updation based overfitting aware few-shot learning mechanism comprises:

repeatedly performing for a predefined plurality of iterations:

initializing an iteration value, wherein the iteration value is updated after each iteration of the plurality of iterations;

training the adversarial lesion detector network based on the plurality of multi-scale source feature maps;

updating a plurality of hyperparameters associated with the adversarial lesion detector network;

computing a decision value based on a plurality of deciding parameters, wherein the plurality of deciding parameters comprises a total number of training samples from the source domain, a total number of few-shot training samples from the target domain and the plurality of hyperparameters;

training the adversarial lesion detector network based on the plurality of multi-scale target feature maps if the iteration value is completely divisible by the decision value, wherein iteration value updation and training of the adversarial lesion detector network is performed if the iteration value is not completely divisible by the decision value; and updating the plurality of hyperparameters associated with the adversarial lesion detector network.

14. The one or more non-transitory machine readable information storage mediums of claim 12, wherein generating the centre-aware map based on the pixelwise abjectness map and the abjectness score based centerness map comprises:

predicting the pixelwise abjectness map based on the plurality of multi-scale source feature maps and the first plurality of multi-scale target feature maps using the adversarial lesion detector network;

predicting an abjectness score based centerness map based on the plurality of multi-scale source feature maps and the first plurality of multi-scale target feature maps using the adversarial lesion detector network; and generating the centre-aware map by multiplying the pixelwise abjectness map and the abjectness score based centerness map.

15. The one or more non-transitory machine readable information storage mediums of claim 11, further comprising a pseudo label generation by:

generating a plurality of pseudo-labels based on the unlabelled dataset pertaining to the target domain using few-shot adversarial lesion detector network, wherein each of the plurality of pseudo-labels comprises a corresponding 4D vector and an abjectness score;

selecting a plurality of confident pseudo-labels from the plurality of pseudo-labels based on a predefined confidence threshold, wherein the plurality of pseudo-labels with the corresponding abjectness score greater than the predefined confidence threshold are selected; and updating the labelled dataset pertaining to the target domain with the plurality of confident pseudo-labels, wherein the few-shot adversarial lesion detector network is further trained using the updated labelled dataset pertaining to the target domain.

* * * * *